United States Patent
Schmidt et al.

(10) Patent No.: US 9,458,539 B2
(45) Date of Patent: Oct. 4, 2016

(54) METAL SURFACES COMPROMISING A THIN GLASS- OR CERAMIC TYPE PROTECTIVE LAYER HAVING HIGH CHEMICAL RESISTANCE AND IMPROVED NON-STICK PROPERTIES

(75) Inventors: Helmut Schmidt, Saarbruecken-Guedingen (DE); Carsten Ludwig Schmidt, Saarbruecken (DE); Christian Schmidt, Saarbruecken (DE)

(73) Assignee: EPG (ENGINEERED NANOPRODUCTS GERMANY) AG, Griesheim (DE)

( * ) Notice: Subject to any disclaimer, the term of this patent is extended or adjusted under 35 U.S.C. 154(b) by 66 days.

(21) Appl. No.: 13/581,773

(22) PCT Filed: Mar. 11, 2011

(86) PCT No.: PCT/EP2011/053733
§ 371 (c)(1),
(2), (4) Date: Aug. 29, 2012

(87) PCT Pub. No.: WO2011/110681
PCT Pub. Date: Sep. 15, 2011

(65) Prior Publication Data
US 2013/0020335 A1   Jan. 24, 2013

(30) Foreign Application Priority Data
Mar. 12, 2010  (DE) .......... 10 2010 011 185

(51) Int. Cl.
| | |
|---|---|
| B05D 3/02 | (2006.01) |
| B65D 6/00 | (2006.01) |
| B32B 15/04 | (2006.01) |
| C23C 18/12 | (2006.01) |
| A47J 36/02 | (2006.01) |
| C04B 35/14 | (2006.01) |
| C04B 35/624 | (2006.01) |

(52) U.S. Cl.
CPC .......... *C23C 18/1208* (2013.01); *A47J 36/025* (2013.01); *C04B 35/14* (2013.01); *C04B 35/624* (2013.01); *C23C 18/122* (2013.01); *C23C 18/1225* (2013.01); *C23C 18/1241* (2013.01); *C23C 18/1254* (2013.01); *C04B 2235/441* (2013.01); *C04B 2235/483* (2013.01); *C04B 2235/9669* (2013.01); *Y02T 50/67* (2013.01); *Y10T 428/25* (2015.01)

(58) Field of Classification Search
None
See application file for complete search history.

(56) References Cited

U.S. PATENT DOCUMENTS

| | | | |
|---|---|---|---|
| 5,108,793 A | 4/1992 | Van Ooij et al. | |
| 5,660,884 A | 8/1997 | Crook et al. | |
| 5,700,523 A | 12/1997 | Petrole et al. | |
| 5,731,091 A | 3/1998 | Schmidt et al. | |
| 5,766,680 A | 6/1998 | Schmidt et al. | |
| 6,077,901 A * | 6/2000 | Roesler et al. | 524/588 |
| 6,162,498 A | 12/2000 | Mennig et al. | |
| 6,389,970 B1* | 5/2002 | Tashiro et al. | 101/462 |
| 6,855,396 B1* | 2/2005 | Mennig et al. | 428/144 |
| 8,133,579 B2* | 3/2012 | Mennig et al. | 428/330 |
| 2002/0012804 A1 | 1/2002 | Heimann et al. | |
| 2008/0118745 A1 | 5/2008 | Endres et al. | |
| 2008/0260950 A1 | 10/2008 | Schottner | |
| 2010/0028631 A1 | 2/2010 | Mennig et al. | |
| 2010/0059113 A1 | 3/2010 | Hasegawa et al. | |
| 2010/0178491 A1* | 7/2010 | Mennig et al. | 428/329 |

FOREIGN PATENT DOCUMENTS

| | | |
|---|---|---|
| CN | 1252107 A | 5/2000 |
| CN | 101573827 A | 11/2009 |
| DE | 4417405 A1 | 11/1995 |
| DE | 19544763 A1 | 6/1997 |
| EP | 1806385 A1 | 7/2007 |
| JP | H04293789 A | 10/1992 |
| JP | H08066314 A | 3/1996 |
| JP | H09504768 A | 5/1997 |
| JP | 2007521984 A | 8/2007 |
| WO | 2008099008 A2 | 8/2008 |
| WO | WO2009000874 A2 * | 12/2008 |

OTHER PUBLICATIONS

Merriam Webster's Dictionary, 10th Edition, 1996, p. 881.*

* cited by examiner

*Primary Examiner* — Vera Katz
(74) *Attorney, Agent, or Firm* — Abel Law Group, LLP

(57) ABSTRACT

The invention relates to articles comprising a metal surface provided with a glass-, glass-ceramic- or ceramic-type protective layer, characterized in that the protective layer comprises a base layer comprising a matrix made of an alkali and/or alkaline earth silicate and an alkali metal- and alkaline earth metal-free top layer comprising a matrix made of an oxidic silicon compound, and to a method for the manufacture of said articles.

The articles comprising the protective layer exhibit high chemical resistance and improved non-stick properties. They are characterized in particular by high dishwasher resistance.

16 Claims, No Drawings

METAL SURFACES COMPROMISING A THIN GLASS- OR CERAMIC TYPE PROTECTIVE LAYER HAVING HIGH CHEMICAL RESISTANCE AND IMPROVED NON-STICK PROPERTIES

BACKGROUND OF THE INVENTION

1. Field of the Invention

The present invention relates to metal surfaces comprising a thin glass- or ceramic-type protective layer having high chemical resistance and improved non-stick properties.

2. Discussion of Background Information

Vitreous or ceramic-type protective layers are usually applied to metallic moulded articles either by enamelling operations, by flame or plasma spray processes, printing processes such as silk screen printing, or by gas phase processes. In order to apply very thin layers practically exclusively gas-phase processes are suitable. In addition, it is also possible to apply so called sol-gel layers, for example by dip methods, the layer thicknesses of which are, however, limited to about 1 µm (see C. J. Brinker, G. W. Scherer: "Sol-Gel Science—The Physics and Chemistry of Sol-Gel-Processing", Academic Press, Boston, San Diego, New York, Sydney (1990)). Due to the very small layer thickness said layers neither have sufficient mechanical nor chemical properties, such as with regard to the attack by acids or bases, corrosion resistance or dishwasher resistance. Gas phase depositions do usually not result in "pinhole"-free layers, because hermetically sealed layer structures can not be obtained due to the kinetically controlled crystal growth on the surface.

To achieve dense enamel layers glass compositions have to be used, which must melt easily at relatively low temperatures as compared to glass melting processes (usually above 1000° C.) to be capable to form a continuous coating on the metal surface. The melting temperatures are, however, usually still between 750 and 800° C., if toxicologically harmless enamels with a minimum requirement to sufficient chemical resistance, for example, to boiling water, weak acids or cooking foods, are to be obtained. Because of the high alkali content required for ease of meltability, such layers are generally of low chemical resistance and are only of limited durability, for example when cleaned in a dishwasher (so called "glass corrosion"). There is also the fact that because of the necessary large layer thickness, the expansion coefficients of said enamels have to be adjusted to a relatively large extent to the metallic moulded articles, thus severely impairing the selection of the composition, since otherwise tensions with crack formation and even chipping will be the result.

This is also one of the reasons why, for example, enamel on aluminium is rarely used in the household appliance sector, especially in cookware, since aluminium melts or deforms strongly at temperatures slightly above 600° C. Analogous relations are found for magnesium or magnesium aluminum alloys. The same also applies to metal elements which are composed of several components, if any of these components is originated from the light metals mentioned above.

It has been proven that the aforementioned disadvantages occur much less frequently when thin vitreous sol-gel coatings are applied, because they have different elastic properties due to their specific microstructure. Thus, for example, sol-gel layers with a thickness of up to 1 µm can readily be heated to a temperature of 500 to 700° C. without occurrence of cracking, e.g. on stainless steel.

Patent documents U.S. Pat. No. 6,162,498 and US-A1-20080118745 describe methods in which vitreous layers are described, which are relatively resistant to abrasion and oxidation corrosion, for instance, tarnishing of stainless steel. The methods comprise the preparation of a coating solution by hydrolysis and polycondensation of one or more silanes in the presence of colloidal silica sol and at least one component of the group of alkali and alkaline earth oxides and/or hydroxides; the application of the coating solution on a metal surface to form a layer, and a thermal densification to form a vitreous film.

According to U.S. Pat. No. 6,162,498 densification temperatures between 350 and 500° C. are used. US 20080118745 further describes the formation of deformable vitreous layers by densification of an alkali silicate containing layer in a two stage process at a preferred temperature of 500° C., the production of coating systems by dipping and spraying with layers in the range of from 5 to 10 µm and the application of the coatings on metal surfaces and metal elements, especially on stainless steel, but also on aluminium and aluminum alloys.

The coatings mentioned in the patent publications cited above have, however, only a limited service life against acids and even more so in an alkaline medium, there can be no talk of years of stability. This is, however, just what customers expect, guarantees of up to 15 years are not uncommon. These layers can already be removed quantitatively in a short time with dilute sodium hydroxide solution (15%) at moderate temperatures (60-90° C.) and have in no account a permanent dishwasher stability. This means that they are usually not suitable for the food sector or as protective coatings for applications at higher or lower pH values.

While it is known in the pertinent sol-gel literature that the chemical resistance can be significantly improved by incorporation of foreign ions acting catalytically and network compacting, such as for instance iron, titanium, aluminum and zirconium, however these elements have serious disadvantages with respect to the stability of the coating sols, because a sufficiently long "pot life" for a spray coating process can not be achieved due to the catalytic effect, and with respect to the thermal densification process itself.

In addition to the required mechanical, thermal and chemical permanent stability, a so-called "easy-to-clean" surface, i.e. a surface with non-stick properties, is also desired in many areas. In particular on objects which are used, for instance, for cooking, frying, roasting or grilling, this is an important issue.

Untreated metal surfaces have virtually no anti-adhesion properties, especially when heated. Food and oils adhere to and can then only be removed completely with considerable mechanical effort. According to the prior art this problem is reduced by the use of organic fluorine containing polymers (PTFE, "Teflon"). Surfaces coated in this manner exhibit excellent hydrophobic and oleophobic effects. However, it has long been known that surfaces coated with Teflon are not stable, neither mechanically nor thermally. Continuous use in kitchens has demonstrated that the "Teflon effect" decays very quickly, especially when using metallic scrapers, turners or spoons.

Moreover, PTFE is now classified as critical by food law, owing to the fact that high polymer PTFE rearranges at higher temperatures into volatile, ring-shaped, partially oxidized molecular structures ("ring-chain equilibrium"). These ingredients can then diffuse or migrate, e.g. into food or liquids which are in direct contact with the coated surface, or be inhaled directly. In particular, inhalation provably results in the impairment of health ("Teflon fever", PTFE toxicosis). To eliminate this risk, the amount of PTFE in coatings should be significantly reduced or completely omitted.

It is an object of the invention to provide metallic substrates having a glass-, glass-ceramic- or ceramic-type coating with improved chemical resistance, in particular improved alkaline resistant and even permanent dishwasher resistant properties, which in addition should have a substantially better anti-adhesive property compared to an uncoated metal surface, although PTFE ("Teflon") should be omitted completely.

SUMMARY OF THE INVENTION

The present invention provides an article which comprises a metal surface having a protective layer. The protective layer is a glass-, glass-ceramic- or ceramic-type layer and comprises (i) a base layer that comprises a matrix of an alkali and/or alkaline earth silicate and (ii) a top layer that is free of alkali metals and alkaline earth metals and comprises a matrix of an oxidic silicon compound.

In one aspect of the article, at least one of (i) and (ii) may contain a pigment and/or a filler, e.g., a catalytically active pigment and/or filler. For example, the pigment and/or filler may comprise at least one of (a) an oxide of one or more elements from main groups III and IV and of subgroups I to V and VIII of the Periodic Table of the Elements, e.g., elements selected from B, Al, Si, Ge, Sn, Y, Ce, Ti, Zr, Fe, Co, Ni, Cu, Zn, Nb, and Ta and (b) a non-oxidic compound, e.g., a compound of main groups III to V such as BN, SiC, graphite, and carbon black. In another aspect, the pigment and/or filler may be platelet-shaped.

In another aspect of the article of the present invention, a fluorine containing and silicon containing anti-adhesive layer may be present on the top layer.

In yet another aspect of the article, the atomic ratio of Si : (alkali metal and/or alkaline earth metal) in the base layer may be from 20:1 to 7:1, e.g., from 15:1 to 10:1.

In a still further aspect of the article, the base layer and/or the top layer may be obtained by a method in which a coating composition prepared by a sol-gel process is wet chemically applied to the metal surface or the base layer, respectively, and thereafter is thermally densified.

In another aspect, the article may be a container and the protective layer may be disposed on the inside or on a part of the inside of the container. Further, the container may have, on a metal surface of the outside or on a part of the outside, an outer protective layer comprising (i) a base layer comprising a matrix of an alkali and/or alkaline earth silicate and (ii) a top layer comprising a matrix of an alkali and/or alkaline earth silicate which comprises at least one filler, e.g., an abrasive filler such as a platelet-shaped filler.

The present invention also provides a method of providing a glass-, glass-ceramic- or ceramic-type protective layer comprising a base layer and a top layer on a metal surface of an article. The method comprises (a) wet-chemically applying a coating composition A comprising an alkali silicate and/or an alkaline earth silicate on the metal surface and thereafter thermally densifying the composition to form the base layer, and (b) wet chemically applying on the base layer a coating composition B comprising an alkali and alkaline earth metal-free hydrolysate or condensate of one or more hydrolyzable silanes and thereafter thermally densifying the composition to form the top layer. Coating composition A can be thermally densified before application of coating composition B or together with coating composition B.

In one aspect of the method, coating composition A and coating composition B may be prepared by a sol-gel process.

In another aspect of the method, the optionally dried coating composition A and/or the optionally dried coating composition B may be densified at a temperature in the range of from 250° to 700° C., e.g., in the range of from 350° to 600° C.

In yet another aspect of the method of the present invention, (i) coating composition A may be obtained by hydrolysis and polycondensation of one or more silanes of general formula (I):

$$R_nSiX_{4-n} \quad (I)$$

wherein the groups X, identical or different from each other, are hydrolyzable groups or hydroxyl groups, the groups R, identical or different from each other, are hydrogen, alkyl, alkenyl and alkynyl groups having up to 4 carbon atoms and aryl, aralkyl and alkaryl groups having 6 to 10 carbon atoms, and n is 0, 1 or 2, provided that at least one silane with n equal to 1 or 2 is used, or oligomers derived therefrom, in the presence of at least one alkali or alkaline earth metal compound, optionally added nanoscale $SiO_2$ particles and/or optionally alkoxides or soluble compounds of B, Al, Si, Ge, Sn, Y, Ce, Ti or Zr; and/or (ii) coating composition B may be obtained by hydrolysis and polycondensation of one or more silanes of general formula (I):

$$R_nSiX_{4-n} \quad (I)$$

wherein the groups X, identical or different from each other, are hydrolyzable groups or hydroxyl groups, the groups R, identical or different from each other, are hydrogen, alkyl, alkenyl and alkynyl groups having up to 4 carbon atoms and aryl, aralkyl and alkaryl groups having 6 to 10 carbon atoms, and n is 0, 1 or 2, provided that at least one silane with n equal to 1 or 2 is used, or oligomers derived therefrom, optionally in the presence of added nanoscale $SiO_2$ particles and/or alkoxides or soluble compounds of B, Al, Si, Ge, Sn, Y, Ce, Ti or Zr; and/or (iii) a coating composition for an optionally used anti-adhesive layer may be obtained by hydrolysis and polycondensation of one or more silanes of general formula (II):

$$Rf(R)_bSiX_{(3-b)} \quad (II)$$

wherein X and R are as defined in general formula (I), Rf is a non-hydrolzable group having 1 to 30 fluorine atoms bound to aliphatic carbon atoms, and b is 0, 1 or 2, and optionally one or more silanes of general formula (I) as defined above, optionally in the presence of added nanoscale $SiO_2$ particles and/or alkoxides or soluble compounds of the metals B, Al, Si, Ge, Sn, Y, Ce, Ti or Zr, or by hydrolysis and polycondensation of one or more silanes of general formula (I) wherein X and R are as defined above and n is 0 in the presence of an organic fluorine compound.

In a still further aspect of the method of the present invention, the atomic ratio of Si : (alkali metal and/or alkaline earth metal) in coating composition A may be from 20:1 to 7:1, e.g., from 15:1 to 10:1

In another aspect, coating composition A and/or coating composition B may contain a pigment and/or a filler e.g., a catalytically active pigment and/or filler.

In another aspect of the method, the method may further comprise the application of a fluorine containing coating composition comprising a hydrolysate or condensate of a hydrolyzable silicon compound onto the top layer and the thermal baking of the composition to form an anti-adhesive layer.

In another aspect of the method, an adhesion promoter may be applied between the base layer and the top layer.

DETAILED DESCRIPTION OF THE INVENTION

It has now surprisingly been found that the disadvantages of these layers described in the literature cited above (U.S. Pat. No. 6,162,498, US-A-20080118745) can be overcome, if the alkali silicate layer on the metal surface is overcoated with an alkali or alkaline earth metal ion-free sol-gel layer which is subsequently densified thermally, so that a two-layered protective layer is formed.

The invention thus relates to an article comprising a metal surface provided with a glass-, glass-ceramic- or ceramic-type protective layer, wherein the protective layer comprises a base layer comprising a matrix made of an alkali and/or alkaline earth metal silicate and an alkali metal- and alkaline earth metal-free top layer comprising a matrix made of an oxidic silicon compound. Furthermore, the invention relates to a method for producing such a protective layer on the metal surface of an article.

According to the invention, on a common alkali silicate and/or alkaline earth metal silicate containing coating composition applied on a metal surface as the base layer, preferably after drying or thermal densifying it, a further but now alkali metal and alkaline earth metal ion-free coating composition, preferably as a sol-gel layer, is applied and thermally densified to form a top layer. The top layer is able to seal the layer containing alkali or alkaline earth metal ions hermetically, and has a substantially better chemical resistance than the base layer. The inventive layer system has an excellent chemical and hydrolytic stability, such as e.g. a high dishwasher resistance.

The contact of pigments and/or fillers with the coating compositions for the base layer or the top layer during application and thermal densification is also advantageous, especially if they are catalytically active, i.e. contain components or ions that have a positive catalytic effect on the densification behavior of silicate sol-gel layers. Particularly preferred are pigments and fillers containing transition metals from the iron group, from the fourth subgroup or elements of the third main group of the Periodic Table of the Elements. The pigments and fillers may be commercially available pigments and fillers. Examples are platelet-shaped pigments or fillers, e.g. alumina, effect pigments such as interference pigments, or pigments or fillers as a powder in any desired shapes, such as iron spinels, which serve e.g. as black pigments. It does not matter whether the preferably catalytically active pigments or fillers in the coating composition, preferably a sol-gel material, are dispersed, or the coating composition, preferably the sol-gel layer, is applied as a thin layer on such a layer containing such pigments or fillers and then thermally densified.

In a further optional step, a fluorine containing coating composition, preferably as a sol-gel layer, can be applied on the top layer and baked, where appropriate. It may be prepared, for instance, from commercially available hydrophobic and/or oleophobic silanes or from co-condensates of such silanes with alkoxysilanes and/or esters of orthosilicic acid. In this manner, the protective layer receives an additional anti-adhesive property.

The inventive combination of a top layer as defined in the claims with a per se conventional base layer as described, for instance in U.S. Pat. No. 6,162,498, was very surprising in regard to prior art knowledge. In the pertinent literature conflicting statements are made which stand in contrast to the observations of the inventors. Thus, from colloid research and sol-gel literature it is well known that when two nanostructured systems such as different particles or layers having different surface charges or different pH values, respectively, are brought into contact, these systems mutually precipitates each other or coagulate in an uncontrolled manner ("colloidal precipitate") and thus structured aggregates or non-porous layers are not obtained.

In fact, according to the present invention, an alkali and/or alkaline earth metal silicate containing base layer, i.e. an alkaline coating composition or base layer, as known e.g. from U.S. Pat. No. 6,162,498, is brought into contact with an acidic alkali ions and alkaline earth ions-free coating composition or top layer, as known e.g. from DE-A-4417405. According to the prior art it was to be expected that the different charges required to stabilize the coating compositions or sols, respectively, neutralize each other at the layer boundaries. Surprisingly, this well-known interfering reaction does not take place.

The incorporation of pigments or fillers in a silicate matrix does not result in a homogeneous glass after thermal densification but a glass ceramic. It is known that cracks can emerge at the phase boundaries glass matrix-ceramic pigment/filler due to different shrinkage processes during sintering at higher temperatures. These defect states are known to reduce the chemical stability. Amazingly, this well-known effect of the weakening of the vitreous coating does not occur in the protective layer according to the present invention. To the contrary, a significant increase in chemical stability can be observed in these cases.

The present invention comprises a process for the production of metal articles with low sintering, thin, glass-, glass-ceramic or ceramic-type protective layers with high mechanical, thermal and chemical resistance, especially suitable for metallic parts and components, including also those which consist of low-melting metals, e.g. aluminum, magnesium or alloys thereof, or components of these metals in combination with high melting metals, wherein the type of the composite is negligible.

Suitable metallic surfaces to be coated according to the invention are all surfaces of semi-finished and finished products which consist of a metal or metal alloy or comprise them. The metal surfaces can also be pre-treated, for instance galvanized, chromed or enamelled. As examples of metallic surfaces, surfaces of steel, especially stainless steel, aluminum, aluminum alloys, tin, copper, chromium or nickel, including galvanized, chromed or enamelled surfaces, can be mentioned. Examples of metal alloys are particularly steel or stainless steel, aluminum, magnesium and copper alloys such as brass and bronze. Metal surfaces made of aluminum and aluminum alloys, steel, stainless steel and galvanized or chromed steel are preferably used. Particularly preferred are so-called sandwich structures containing, for reasons of improved thermal conduction or heat distribution, respectively, cores made of aluminum or aluminum alloys, which however have upper and lower sides made of stainless steel for the purpose of a mechanically resistant surface or for decorative reasons. This composite of three elements has proved successful especially for the cooking area, for instance, for griddle pans and other cooking utensils and vessels. These are articles which are particularly preferably provided with the protective layer according to the present invention.

Before applying the coating composition, the metallic surface is preferably cleaned thoroughly and especially freed of grease and dust. Prior to coating, a surface activation, for instance by corona discharge or flame treatment, may also be carried out.

The metallic surface or the metallic substrate may have a flat or structured surface. The metallic surface preferably has a structured surface. It may be a microstructured surface or a structure of greater dimensions. The structure may be regular, as obtained, for example, by embossing, or irregular, as obtained, for example, by roughening, for which brushing, sandblasting or shot-peening are common methods. According to the invention, two or more glass-, glass ceramic- or ceramic-type thin coatings on the metallic surface or the metallic substrate are obtained by application of corresponding coating compositions for the base layer and the top layer onto the substrate directly or onto a layer optionally containing pigments or fillers and thermal densification of the layers applied. The coating compositions for the base layer and the top layer are each preferably coating sols, especially agglomerate-free dispersed coating sols, wherein preferably pigments and/or fillers acting as condensation catalysts may be added to the coating composition Preferred and/or optional method steps according to the invention are explained in the following.

a) The coating composition for the base layer, which is preferably a composite coating solution or a composite coating sol, is preferably obtainable by hydrolysis and condensation of one or more organoalkoxysilanes and optionally and preferably of at least one ester of orthosilicic acid in the presence of at least one alkali metal compound and/or alkaline earth metal compound which is preferably soluble or thermally decomposable. Preferred alkali metal compounds and/or alkaline earth metal compounds are a soluble oxide, hydroxide or a soluble or thermally readily decomposable compound of an alkali metal and/or alkaline earth metal. An alkali metal compound, in particular of lithium, sodium, potassium or cesium is preferred. Optionally, the hydrolysis or condensation may also be carried out in the presence of colloidal silica sol and/or an alkoxide from the third or fourth main or sub-groups of the Periodic Table of the Elements, such as e.g. the elements B, Al, Ge, Sn, Ti, Zr, as well as other elements such as P or Nb. A coating composition which can be preferably used as the base layer is e.g. the one that is described in U.S. Pat. No. 6,162,498 for preparing a vitreous layer. The particulars listed therein are explicitly incorporated herein by reference.

b) The coating composition, preferably a coating sol, for the base layer is coated on the metallic surface of the article, preferably with a wet film thickness of 5 to 20 µm, more preferably 8 to 11 µm. Any common wet chemical coating method may be used for the application process. Preferred is a spraying process.

c) As a rule, it is as usual convenient to dry the coating composition applied, for instance drying of the wet film to dust dryness. The coating composition applied is usually e.g. a sol-gel layer.

d) In one embodiment, the applied coating composition, in particular the sol-gel layer, of the base layer, may be directly thermally densified to form the vitreous, glass-ceramic- or ceramic-type base layer. The temperatures can vary within a wide range, for instance in a range from 250 to 700° C., preferably baking is carried out at temperatures ranging from 350 to 600° C., more preferably from 450 to 500° C. The thermal treatment can be carried out under the common atmospheres, e.g. in air, inert gas and/or under oxidizing or reducing conditions. As known by the skilled person, certain atmospheres may be appropriate depending on the components used, e.g. a reducing atmosphere when carbon black is used as a pigment, or an oxidizing atmosphere when coloring iron(III) compounds are used, the color of which depends on the maintenance of iron(III) during the baking process.

e) On the optionally cooled substrate or the component or on the base layer thereof which has already been thermally densified and cooled or which was e.g. only dried, the coating composition of the topcoat is applied, for instance, a composition according to DE-A-4417405, which is hereby incorporated by reference, for instance example 1. Any conventional wet chemical coating method may be used as the coating method, wherein a spraying process is preferred. As a rule, it is as usual convenient to dry the coating composition applied, for instance drying of the wet film to dust dryness. The coating composition applied is usually e.g. a sol-gel layer.

f) The applied coating composition, especially the sol-gel top layer is thermally densified to form the glass-, glass ceramic- or ceramic-type top layer. The temperatures can vary within a wide range, for instance in a range from 250 to 700° C., wherein temperatures ranging from 350 to 600° C., and especially from 450 to 500° C. are preferred for the baking process. Preferred layer thicknesses are 3 to 8 µm, particularly preferably 4 to 6 µm. With respect to the atmosphere the same applies what has been said for the thermal densification of the base layer.

g) As an alternative to step d) also the overcoating according to e) can take place e.g. after drying the coating according to step c). The baking process of the "double layer" applied is carried out as described in step d) or f).

h) Pigments and/or fillers can be dispersed into the coating composition for the base layer and/or for the top layer, which are each preferably a coating sol, both in a) and in e). Pigments and fillers are solid particles, wherein pigments are coloring agents. Optionally, the pigments or fillers have previously been provided with a corresponding surface modification to improve dispersibility because an agglomerate-free dispersion increases the chemical stability of the final homogeneous layer. Platelet-shaped entities as well as other geometries of the pigments or fillers are possible.

Appropriate pigments and fillers are known and generally available commercially. Ceramic pigments are particularly suitable because of their temperature stability. Examples include white pigments, e.g. $TiO_2$, black pigments, e.g. carbon black, complex iron mixed oxides, colored pigments for all visible colors. Details can be found for instance in G. Pfaff, "Industrial Inorganic Pigments" Wiley VCH, 2008, or H. Endriss, "Aktuelle anorganische Buntpigmente", Verlag Vincentz, 1997. The pigments and fillers may be, for instance, oxides, such as spinels, rutiles, perovskites and silicates, sulfides, oxynitrides, nitrides such as BN, carbides such as SiC or elements, such as carbon black and carbon. The pigments and fillers may take any shape, for instance spherical, e.g. Fe spinels, platelet-shaped or plate-like, e.g. interference pigments, mica pigments, or fibrous, e.g. AlOOH. Suitable fillers are, for instance abrasive fillers, e.g. with a Mohs' hardness of at least 7, e.g. platelet-shaped $Al_2O_3$, platelet-shaped $SiO_2$ and $TiO_2$.

The pigments and fillers preferably consist of oxides, in particular oxides of the third and fourth main group or subgroup of the Periodic Table of the Elements, especially the oxides of the elements B, Al, Si, Ge, Sn, Y, Ce, Ti or Zr, or of the transition metals Fe, Co, Ni, Cu, Zn, Nb or Ta. It is also possible to use mixtures or compounds of these oxides, for example spinels, or oxide particles coated with interference layers, preferably consisting of $SiO_2$ or $Al_2O_3$, or oxidic platelet-shaped particles which may also include other oxidic compositions, for example mica platelets. Pigments, which are also commercially available by the name of effect or interference pigments, are usually coated with e.g. oxidic interfering layers of $TiO_2$, $Al_2O_3$, $ZrO_2$ or $Fe_2O_3$ which enable, through their interference effect, a broad spectrum of different colors and generate in dispersed form what is called the "metallic effect". These oxides should of course be considered merely to be illustrative, and it is also possible to use others. The particle sizes of these pigments/fillers used are unimportant. WO 2008/099008 describes a process in which wet grinding of such pigments with a starting size of approximately 25 μm gives pigments in the order of magnitude of 5 μm, which lead to particularly smooth layers. For the production of dishwasher resistant or alkali resistant colored layers according to the present invention, however, the shape and size of the pigment or filler particles are practically not crucial. Expediently, the particles are not too large, the mean diameter of the particles should not exceed the micrometer range, e.g. less than 1 mm. Preferred pigment and filler particles have e.g. an average diameter of less than 200 μm, preferably less than 100 μm. Standard sizes for commercially available pigments are, for instance 5 to 25 μm. Particles, in particular filler particles are also available with much smaller dimensions.

i) For particular requirements with respect to an anti-adhesive effect, the coating system may optionally be extended by a fluorine containing cover layer over the above-described top layer. This may include coating systems as described for instance in DE 19544763. Furthermore, solutions of polyfluoroethylene modified with ethoxysilane, such as Fluorolink® S10 from Solvay Solexis, or coating sols prepared by hydrolysis and condensation of one or more organoalkoxysilanes, one or more esters of orthosilicic acid, ethoxysilane-modified polyfluoroethylene, optionally in the presence of colloidal silica sol, can be employed.

These fluorine containing coating compositions are preferably used in extremely small quantities. Preferably, a layer of only a few nm thickness ("monolayer coverage") is formed as opposed to otherwise deposited PTFE (Teflon) layers, which have layer thicknesses of several μm, and they do not have a polymeric structure. The fluorine containing coating compositions according to the invention are not subject to the "ring-chain" equilibrium explained above and thus do not form harmful PFOA.

The densified base layer is an alkali silicate and/or alkaline earth silicate or a matrix of alkali silicate and/or alkaline earth silicate, which is preferably an alkali silicate, in which optionally additional components such as pigments or fillers or other additives are contained. An alkali silicate and/or alkaline earth silicate is a silicate containing alkali metal ions and/or alkaline earth metal ions. These silicates are well-known to the person skilled in the art. Examples of preferred alkali metals and alkaline earth metals in the silicate are Li, Na, K, Cs, Mg, Ca and/or Ba, wherein alkali metals, especially Na and/or K, are particularly preferred. In the silicate framework, a part of the Si ions may optionally be replaced with other ions such as Al, but this is generally not preferred. The base layer is obtainable by wet chemical application of a coating sol obtained by the sol-gel process and thermal densification of the coating sol (sol-gel layer), usually after drying.

The densified base layer can be described as a preferably vitreous alkali silicate and/or alkaline earth silicate. The presence of leachable ions, i.e. alkali or alkaline earth metal ions, in the base layer which lower the chemical stability appears at first counter-productive, but they have been proven advantageous with respect to required properties such as adhesive strength and thermal expansion of the coating. As is known, alkali ion containing silicate systems have a different (higher) thermal expansion coefficient than alkali ion-free silicate systems. The extent of this expansion correlates with the nature and the amount of alkali or alkaline earth metal ions in the silicate network and can be interpreted with the function of the ions as network softening "network modifiers".

Metallic substrates, in particular the easily softenable or fusible metals, exhibit a much higher thermal expansion than an ion-free vitreous silicate coating. The lack of "thermal match" between metallic substrate and coating can lead to stress cracks that affect adhesive strength and chemical stability. By the addition of alkali metal ions or alkaline earth metal ions to the silicate base layer, the thermal expansion coefficient of the layer can be adapted to that of the substrate. Cracks and chips are thus prevented. Moreover, the base layer, which is in direct contact with the metallic substrate, should undergo a very strong, ideally a chemical bond. This ensures an efficient adhesion, leading to layers which are not subvertable, also if selective damages are present.

The formation of this chemical bond obviously possesses the highest driving force (bonding enthalpy) with the selected process parameters (thermal densification). This chemical linkage of substrate and base layer enables the good adhesion to the substrate. In the case of an ion-free silicate base layer formation of a non-ionic Fe—O—Si bridge would be necessary for chemical linkage, which is formed at much higher temperatures only.

The densified alkali and alkaline earth metal-free top layer comprises a matrix of an oxidic silicon compound, for example a silicon oxide, a polysilicic acid or a polysiloxane, in which optionally additional components are contained, such as pigments or fillers or other additives.

Alkali and alkaline earth metal-free includes naturally alkali metal ion-free and alkaline earth metal ion-free, i.e. the oxidic silicon compound of the top layer is not an alkali and/or alkaline earth silicate. The term: alkali and alkaline earth metal-free does naturally not exclude traces of alkali metal and alkaline earth metal ions in the top layer, which can for instance be introduced by ionic impurities in the materials used for the coating composition. For instance, the alkali content in Levasil®, a silica sol that is stabilized by $Na^+$ ions, may be up to 0.2 wt-%. The addition of Levasil® into the coating composition of the top layer would therefore introduce small amounts of alkali metal, but this does not result in a formation of an alkali silicate. In other words, alkali and alkaline earth metal-free top layer or oxidic silicon compound means that the atomic ratio of Si to (alkali metal and/or alkaline earth metal) is greater than 500, in particular greater than 1,000.

In the silicon-oxide-framework, a portion of the Si ions may optionally be replaced with other ions such as Al, but this is generally not preferred. The top layer is obtainable by wet chemical application of a coating sol obtained according to the sol-gel method and thermal densification of the coating sol (sol-gel layer), usually after drying.

By applying a sealing alkali metal and alkaline earth metal-free top layer according to e) on the base layer a), the chemical resistance of the coating is ensured and, in particular a significantly improved alkaline resistance of the coating system is achieved, which is important for use in dishwashers. It is known that unsealed alkali ions containing coatings ("alkali silicates") are exposed to hydrolytic (chemical) attack over time. This attack depends on the type and amount of the ions present. It results in the leaching of the ions from the silicate structure and formation of superficial alkali metal carbonates (for instance "trona"). In addition, the silicate structure is transferred to an unstable water containing xerogel of silicic acid. Both effects (formation of carbonate and xerogel) lead to opacification of the previously "crystal clear" coating ("glass corrosion"). Coating the alkali and/or alkaline earth silicate base layer with an ion-free barrier layer retards the leaching process. This is because the nearly pore free coating of the top layer significantly reduces the diffusion paths of the alkali ions or of the aggressive chemical molecular agents (acids, bases, water). These mobile elements can only find each other when they diffuse through the silicate network of the top layer, which acts as a barrier layer. In practice, this process takes place with such a low speed that it is practically not observable and one can refer to permanent stability.

The addition of pigments or fillers, both in the base layer and top layer, can still further increase stability. This effect could be explained by the fact that, as is known from the pertinent glass literature, the alkali resistance of vitreous silicate systems can be significantly improved if specific, network-stabilizing ions are incorporated into the glass structure. Included are the above mentioned elements of the third and fourth main and sub-group and the transition metals of the iron group. The observable network stabilizing effect can be explained by the diffusion of such ions from the pigment/additive surface into the micro- or nanopore structure of the coating material after a), before the structure is thermally densified to non-porous vitreous structure.

An important object of this invention was to develop a coating system, with which articles of daily use, kitchen appliances, cookware, cutlery, accessories, electrical appliances and many other things can be coated, which require a high degree of decorative impression, and also a sufficient chemical resistance, and for which by the sole use of metals with low softening or melting point or the use of these metals in combination with high melting metals (copper, steel, stainless steel, brass) the use of commercially available so-called "acid-proof" enamels is not possible. One of these requirements is the dishwasher resistance described above. Examples of other requirements are resistance to skin perspiration, acids and alkalis, to various components in foods, e.g. organic acids, complexing agents, proteins, surfactants etc., or to salt loading, such as in the automotive sector.

The coating composition for the base layer is, for instance obtainable by hydrolysis and polycondensation of one or more silanes of general formula (I)

$$R_nSiX_{4-n} \quad (I)$$

wherein the groups X, equal to or different from each other, are hydrolysable groups or hydroxyl groups, the groups R, identical or different from each other are hydrogen, alkyl, alkenyl and alkynyl groups having up to 4 carbon atoms and aryl, aralkyl and alkaryl groups having 6 to 10 carbon atoms and n is 0, 1 or 2, with the proviso that at least one silane with n equal to 1 or 2 is used, or oligomers derived therefrom, in the presence of
a) at least one of alkali and alkaline earth metal compound, preferably from the group of oxides and hydroxides or organometallic compounds of alkali and alkaline earth metals, and
b) optionally added $SiO_2$ particles, especially nanoscale $SiO_2$ particles and/or
c) optionally alkoxides or soluble compounds of the metals B, Al, Si, Ge, Sn, Y, Ce, Ti or Zr.

The alkali or alkaline earth metal compound may, for instance be a compound of Li, Na, K, Mg, Ca or Ba, where multiple of them may also be used. Basic compounds are preferred, such as oxides and hydroxides of alkali and alkaline earth metals. These oxides and hydroxides are preferably those of Li, Na, K, Mg, Ca and/or Ba. Preferably alkali metal hydroxides are used, especially NaOH and KOH. As organometallic compounds e.g. alkoxides of the alkali and alkaline earth metals can be considered, e.g. calcium alkoxide.

The base layers prepared according to the invention typically have a layer thickness of 1 to 20 μm, preferably 5 to 15 μm and in particular 8 to 12 μm.

The coating composition for the topcoat is, for instance obtainable by hydrolysis and polycondensation of one or more silanes of general formula (I):

$$R_nSiX_{4-n} \quad (I)$$

wherein the groups X, same or different from each other, are hydrolysable groups or hydroxyl groups, the groups R, same or different from each other, are hydrogen, alkyl, alkenyl and alkynyl groups having up to 4 carbon atoms and aryl, aralkyl and alkaryl groups having 6 to 10 carbon atoms and n is 0, 1 or 2, with the proviso that at least one silane with n equal to 1 or 2 is used, or oligomers derived therefrom. Optionally, the hydrolysis and polycondensation can be carried out in the presence of
a) optionally added $SiO_2$ particles, especially nanoscale $SiO_2$ particles, and/or
b) optionally alkoxides or soluble compounds of the metals B, Al, Si, Ge, Sn, Y, Ce, Ti or Zr.

The top layers prepared according to the invention typically have a layer thickness of 1 to 15 μm, preferably 4 to 12 μm and in particular 6 to 10 μm.

Fluorine containing coating compositions are described e.g. in DE-A-19544763 which are hereby incorporated by reference. The coating composition for the fluorine containing anti-adhesive layer, which can be optionally applied to the top layer is, for instance obtainable by hydrolysis and polycondensation of one or more silanes of general formula (II) (fluorosilanes):

$$Rf(R)_bSiX_{(3-b)} \quad (II)$$

wherein X and R are defined as in formula (I), Rf is a non-hydrolysable group which has from 1 to 30 fluorine atoms bonded to aliphatic carbon atoms, and b is 0, 1 or 2, and optionally and preferably one or more silanes of general formula (I) as defined above for the base layer and top layer, optionally in the presence of
a) optionally added $SiO_2$ particles, in particular nanoscale $SiO_2$ particles, and/or
b) optionally alkoxides or soluble compounds of the metals B, Al, Si, Ge, Sn, Y, Ce, Ti or Zr.

Rf preferably has 2 to 30 aliphatic carbon atoms, wherein at least one fluorine atom is bonded to at least one of the aliphatic C atoms. Rf preferably has at least 2 aliphatic carbon atoms to which is at least one fluorine atom is bonded. In formula (II) Rf is preferably a fluorinated alkyl group, e.g. with 3 to 20 C atoms, and examples are $CF_3CH_2CH_2$, $C_2F_5CH_2CH_2$, n-$C_6F_{13}CH_2CH_2$, i-$C_3F_7OCH_2CH_2CH_2$, n-$C_8F_{17}CH_2CH_2$ and n-$C_{10}F_{21}$—$CH_2CH_2$. An example for Rf is 1H,1H,2H,2H-perfluorooctyl, for instance 1 H,1 H,2H,2H-perfluorooctyltriethoxysilane (FTS) is suitable.

Alternatively, an organic fluorine containing compound, e.g. perfluoroethene, which is modified with alkoxysilane, may be employed. Also in this case, the fluorine containing coating composition comprises a hydrolysate or condensate of a hydrolysable silicon compound. The fluorine containing coating composition therefore contains preferably a hydrolysate or condensate of a hydrolysable silicon compound, wherein the hydrolysate or condensate contains fluorine containing groups which are bonded to silicon atoms of the hydrolysate or condensate, or an organic fluorine compound is modified with the hydrolysate or condensate. The organic fluorine compound may be an oligomer.

Further explanations on suitable silanes of formula (I) will follow. Unless otherwise indicated, these statements equally apply to the silanes of formula (I), which are used in the coating compositions of the base layer, the top layer and the anti-adhesive layer.

Among the above silanes of general formula (I) there is at least one silane, in which general formula n has a value of 1 or 2. In general, at least two silanes of general formula (I) are used in combination or, in the case of the anti-adhesive layer, a silane of formula (I) and a silane of formula (II). In these cases, these silanes are preferably used in a ratio such that the average value of n (on a molar basis) is 0.2 to 1.5, preferably 0.5 to 1.0. An average value of n in the range of 0.6 to 0.8 is particularly preferred.

In general formula (I) the groups X, which are identical or different from each other, represent hydrolysable groups or hydroxyl groups. Specific examples of hydrolysable groups X are halogen atoms (especially chlorine and bromine), cyanates and isocyanates, alkoxy groups and acyloxy groups having up to 6 carbon atoms. Particularly preferred are alkoxy groups, especially $C_{1-4}$ alkoxy groups such as methoxy, ethoxy, n-propoxy and i-propoxy. The groups X in a silane are preferably identical, wherein particularly preferably methoxy or ethoxy groups are used.

The groups R in general formula (I), which in the case of n=2 may be the same or different, are hydrogen, alkyl, alkenyl and alkynyl groups having up to 4 carbon atoms and aryl, aralkyl and alkaryl groups having 6 to 10 carbon atoms. Specific examples of such groups are methyl, ethyl, n-propyl, i-propyl, n-butyl, sec-butyl and tert-butyl, vinyl, allyl and propargyl, phenyl, tolyl and benzyl. The groups may have common substituents, but preferably such groups do not have substituents. Preferred groups R are alkyl groups having 1 to 4 carbon atoms, in particular methyl and ethyl, and phenyl. It is preferred in accordance with the invention when at least two silanes of the general formula (I) are used, where n=0 in one case and n=1 in the other case. Such silane mixtures comprise, for example, at least one alkyltrialkoxysilane (e.g. (m)ethyltri(m)ethoxysilane) and one tetraalkoxysilane (e.g. tetra(m)ethoxysilane), which are preferably used in such a ratio that the average value of n is within the above-specified preferred ranges. A particularly preferred combination for the starting silanes of the formula (I) is methyltri(m)ethoxysilane and tetra(m)ethoxysilane, which are preferably used in such a ratio that the average value of n is within the above-specified preferred ranges. A particularly preferred combination for the starting silanes of the formula (I) is methyl-tri(m)ethoxysilane and tetra(m)ethoxysilane.

The hydrolysis and condensation of the hydrolysable starting compounds is preferably carried out by the sol-gel process. In the sol-gel process, the hydrolysable compounds are hydrolysed with water, usually in the presence of acidic or basic catalysts, and at least partly condensed. The acidic hydrolysis and condensation is preferably carried out in the presence of acidic catalysts (e.g. hydrochloric acid, phosphoric acid or formic acid), for instance at a pH value of preferably 1 to 3. The preparation of the coating composition for the top coat is preferably carried out by acidic catalysis. The sol which forms may be adjusted to the viscosity desired for the coating composition by virtue of suitable parameters, for example degree of condensation, solvent or pH.

Further details of the sol-gel process are described, for example, in C. J. Brinker, G. W. Scherer: "Sol-Gel Science—The Physics and Chemistry of Sol-Gel-Processing", Academic Press, Boston, San Diego, New York, Sydney (1990).

The hydrolysis and polycondensation of the silane(s) of the general formula (I) is conducted, in the case of the base layer, preferably in the presence of at least one compound from the group of the alkoxides, oxides, hydroxides or soluble compounds or compounds thermally decomposable up to 400° C. of the alkali metals and alkaline earth metals. These compounds are preferably those of Li, Na, K, Cs, Mg, Ca and/or Ba. Preference is given to using alkali metals, especially Na and/or K. When an alkali metal compound is used, it is preferably used in such an amount that the Si:alkali metal atomic ratio is in the range from 20:1 to 7:1, especially from 15:1 to 10:1. In each case, the atomic ratio of silicon to (alkali metal and alkaline earth metal) is selected at a sufficiently high level that the resulting coating is not water-soluble, as for instance in the case of water glass. The atomic ratio Si:(alkali metal and/or alkaline earth metal) refers to the total of existing alkali metals and alkaline earth metals or alkali metal ions and alkaline earth metal ions. For instance, if no alkaline earth metal is present, the sum is naturally limited to the existing alkali metal atoms or ions.

Any nanoscale $SiO_2$ particles optionally used in addition to the hydrolysable silanes of general formula (I) are preferably used in such an amount that the ratio of all Si atoms in the silanes of general formula (I) to all Si atoms in the nanoscale $SiO_2$ particles is in the range from 5:1 to 1:2, in particular from 3:1 to 1:1.

Nanoscale $SiO_2$ particles are understood to mean $SiO_2$ particles having an average particle size (or an average particle diameter) of preferably not more than 100 nm, more preferably not more than 50 nm and especially not more than 30 nm. For this purpose, it is also possible, for example, to use commercial silicic acid products, for example silica sols such as the Levasils®, silica sols from Bayer AG, or fumed silicas, for example the Aerosil products from Degussa. It is likewise possible to use silica sols in alcoholic solvents, as supplied, for example, by Nishin Chemicals. The particulate materials can be added in the form of powders and sols. However, they can also be formed in situ in the course of hydrolysis and polycondensation of the silanes.

The hydrolysis and polycondensation of the silanes can be conducted in the absence or presence of an organic solvent. Preferably, no organic solvent is present. When an organic solvent is used, the starting components are preferably soluble in the reaction medium (which generally includes water). Suitable organic solvents are especially water-miscible solvents, for example mono- or polyhydric aliphatic alcohols (for example methanol, ethanol), ethers (for example diethers), esters (for example ethyl acetate), ketones, amides, sulfoxides and sulfones. Otherwise, the hydrolysis and polycondensation can be conducted according to the modalities familiar to those skilled in the art.

The optionally added compounds of B, Al, Si, Ge, Sn, Y, Ce, Ti or Zr or of the transition metals Fe, Co, Ni, Cu, Zn, Nb or Ta, which react thermally to give oxidic components, can be used in the form of soluble alkoxides or soluble compounds which decompose at temperatures up to 100° C., for example salts of organic acids. Examples thereof are acetates, formates, propionates or oxalates, but also all other organic acids which are soluble in the reaction medium. Additionally useful are the examples of readily decomposable nitrates which are known from the literature.

The organic group Rf in the formula (II) introduced in the case of the anti-adhesive layer preferably has at least 3, preferably at least 4 and especially at least 5 aliphatic carbon atoms to which at least one and preferably at least 2 fluorine atoms are bonded. These groups Rf are preferably partially fluorinated alkyl and/or alkenyl groups. More particular examples are for example described in DE 19544763, which is hereby incorporated by reference.

Oxidic pigments which may be optionally used in the layers include commercial color pigments, for example spinels, especially aluminum spinels, oxides of transition metals such as iron, cobalt or nickel, but also mixtures of the same. In addition, it is also possible to use carbon blacks to deepen the color.

Useful effect pigments include what are called interference pigments with oxidic composition. These include all commercial effect pigments, for example the Iriodin® pigments from Merck company.

To produce an agglomerate-free dispersion, commercial surface modifiers, for example functional silanes or chelate-forming complexing agents with suitable functional groups, are optionally used. Examples of silanes are the epoxy silanes for production of hydrophilic surfaces, or alkylalkoxysilanes for production of hydrophobic surfaces. Examples of chelate-forming complexing agents are, for example, β-diketones.

A pigmented coating composition is preferably produced by hydrolysis and condensation of the hydrolysable starting compounds for the oxidic matrix, in particular silanes, in the presence of agglomerate-free dispersed pigments, and in the case of the coating composition of the base layer, in the presence of the alkali and/or alkaline earth metal compounds.

Further explanations as to the composition of the coating composition, for instance with respect to other possible additives and related process steps, such as application and drying, will follow. Unless otherwise stated these specifications apply equally to each of the coating compositions of the base layer, the top layer and the anti-adhesive layer and the process steps associated therewith.

The coating compositions used in accordance with the invention may include additives customary in the coatings industry, for example additives which control rheology and drying characteristics, wetting and leveling aids, antifoams, solvents, dyes and pigments. Suitable solvents are, for example, alcohols and/or glycols, for example a mixture of ethanol, isopropanol and butylglycol. It is also possible to add commercial matting agents, for example microscale $SiO_2$ or ceramic powders, in order to achieve matt layers with anti-fingerprint properties. If they are used, the silanes can be hydrolyzed and polycondensed in the presence of matting agents, for example microscale $SiO_2$ or ceramic powders. However, they can also be added to the coating composition at a later stage.

The coating composition used in accordance with the invention optionally provided with pigments and/or fillers can be applied to the metal surface or to the base or top layer already applied by customary coating methods. Usable techniques are, for example, dipping, casting, flow-coating, spin-coating, spraying, spreading or screen printing. Particular preference is given to automated coating processes such as flat spraying, use of spray robots and automatic spraying with machine-guided rotating or swiveling substrates. For dilution, customary solvents can be used, as are commonly used in the coatings industry.

The coating composition applied to the metallic surface or to the base or top layer may normally be dried, e.g. at room temperature or slightly elevated temperature, for example a temperature of up to 100° C., especially up to 80° C., before it is densified thermally to a vitreous, glass-ceramic- or ceramic-type layer. The thermal densification can optionally also be effected by IR or laser radiation.

Particularly preferred application methods for the coating compositions are spray-coating, printing and other methods such as screen printing, roller coating, flexoprint, pad printing, inkjet, dipping procedures. For the sequence of thermal densification the following alternatives are particularly useful: 1) applying the composition for the base layer, baking the base layer, applying the composition of the top layer and subsequent baking, or 2) applying the composition for the basecoat, drying, applying the composition for the top layer and subsequent baking of both layers together.

Appropriate for drying or pre-drying the coating compositions applied are for instance infrared, heat or, for non-metallic substrates also heating by microwave. The thermal densification may be conducted, for instance by heating in batch ovens, conveyor ovens or truck kilns. The thermal densification or baking, respectively, can be carried out under different atmospheres, for instance in air, in nitrogen, or under reducing conditions, for example forming gas.

The fluorine containing anti-adhesive layer may be preferably applied, for instance by spraying, dipping or rubbing. The anti-adhesive coating is also preferably thermally densified, the burning of the non-stick coating can, for instance be carried out at temperatures between 200 and 400° C. In the inventive process a coupling agent may be applied between the base coat and top coat.

In the second step, a preferably vitreous top layer is applied to the base layer which is substantially free of alkali and/or alkaline earth metal ions. Such a preferably vitreous layer may be provided on the preferably vitreous and preferably pigmented layer prepared according to the invention in that the base layer applied on the metal surface according to the invention, prior to the thermal densification and preferably after drying at room temperature or elevated temperature, is provided with the coating composition for the vitreous layer and both coatings are then densified thermally together.

According to the invention, the metallic surface is provided with a weather-resistant, corrosion inhibiting, scratch-resistant, alkali-resistant and dishwashing-resistant protective layer which especially also helps to prevent soiling, for example by fingerprints, water, oil, grease, surfactants, and dust.

Examples of articles with metallic surfaces, which are particularly suitable for the inventive coating are metallic components for buildings and parts thereof, such as facade panels made of steel, stainless steel, aluminum and aluminum alloys; means of locomotion and transport and parts thereof; equipment, apparatus and machines for commercial or industrial purposes and research and parts thereof; household articles and equipment for the household and parts thereof; electrical appliances and cooking utensils, cookware, containers, cutlery and parts thereof; devices and aids for games, sport and leisure and parts thereof; and devices, aids and apparatus for medical purposes and invalids. Moreover, the coatings are also suitable in analogous manner for application to ceramic or glass surfaces.

Specific examples of such coatable materials or articles as a substrate are specified below. The coated surfaces are preferably metallic surfaces of steel or stainless steel.

Built structures (especially buildings) and parts thereof:

Internal and external facades of buildings, floors and stairways, escalators, lifts, for example their walls, banisters, furniture, paneling, fittings, doors, handles (especially with anti-fingerprint finishes, for example door handles), sheet metal for facades, floor-coverings, windows (especially window frames, window sills and window handles), blinds, fittings in the kitchen, bathroom and toilet, shower cubicles, sanitary cubicles, toilet cubicles, generally objects in the sanitary sector (for example toilets, wash basins, fittings, accessories), pipes (and especially drainpipes), radiators, light switches, lamps, lighting, letterboxes, cash dispensers, information terminals, seawater-resistant coating for the finishing of harbor constructions, eaves, gutters, aerials, satellite dishes, handrails on banisters and escalators, ovens, wind turbines, especially rotor blades, monuments, sculptures, and generally works of art with metallic surfaces, especially those which are exhibited outdoors.

Household items and equipment for the household and parts thereof:

Trash cans, dishware and cookware (for example of stainless steel, aluminium, aluminium alloys and sandwich metals, in particular three-ply with a core of aluminium or aluminium alloys and at the exterior with other metals, e.g. stainless steel), cutlery (for example knives), trays, pans, pots, baking tins, cooking utensils (for example graters, garlic presses and holders), hanging devices, refrigerators, cooking area frames, cooking hobs, hotplates, heated surfaces, baking ovens (internal and external), egg boilers, microwave units, kettles, grill grids, steamers, ovens, working surfaces, fittings in the kitchen sector, dust extractor hoods, flower vases, casings of TV equipment and stereo units, casings of (electrical) household equipment, flower vases, Christmas tree baubles, furniture, furniture fronts made of stainless steel, sinks, lamps and lighting.

Means of locomotion and transportation (for example passenger vehicle, heavy goods vehicle, omnibus, motor bike, moped, bicycle, railway, tramway, ship and aeroplane) and parts thereof:

Mudguards for bicycles and motorbikes, instruments on motorbikes, door handles, steering wheels, tire rims, exhaust systems and pipes, thermally stressed parts (engine parts, linings, valves and valve linings), fittings, latent heat exchangers, coolers, parts of the interior trim with metallic surface (for example as a scratch-resistant coating), fuel nozzle, luggage carrier, roof container for passenger vehicles, display instruments, tankers, for example for milk, oil or acid, and generally all chassis parts and seawater-resistant coating for the finishing of ships and boats.

Equipment, devices and machines (for example from plant construction (chemical industry, foods industry, power plants) and energy technology) for commercial or industrial purposes and research and parts thereof:

Heat exchangers, compressor wheels, gap helical exchangers, Cu elements for industrial heating, molds (for example casting molds, especially of metal), rubble chutes, filling plants, extruders, waterwheels, rollers, conveyor belts, printing machines, screen printing templates, filling machines, (machine) casings, drill heads, turbines, pipes (internal and external, especially for liquid and gas transport), stirrers, stirred tanks, ultrasound baths, cleaning baths, containers, transport devices in ovens, internal lining of ovens for high-temperature, oxidation, corrosion and acid protection, gas bottles, pumps, reactors, bioreactors, tanks (for example fuel tanks), heat exchangers (for example in food processing technology or for (biomass) fuel tanks), waste air units, saw blades, covers (for example for balances), keyboards, switches, knobs, ball bearings, shafts, screws, solar cells, solar units, tools, tool handles, liquid containers, insulators, capillaries, laboratory equipment (for example chromatography columns and fume hoods) and parts of electrical accumulators and batteries.

Aids for games, sport and leisure:

Garden furniture, garden equipment, tools, playground equipment (for example slides), snowboards, scooters, golf clubs, dumbbells, weights, training equipment, fittings, sitting opportunities in parks, playgrounds, fitting items and equipment in swimming pools, etc.

Equipment, aids and devices for medical purposes and invalids:

Surgical instruments, cannulas, medical containers, dental equipment, spectacle frames, medical tools (for operations and dental treatment), generally items from the sector of medical technology (for example pipes, apparatus, containers) and wheelchairs, and also quite generally hospital equipment.

Besides the above articles, also other articles and parts thereof can of course be advantageously provided with the above surface layers, such as toys, jewelry or coins.

Particularly preferred are all sorts of articles in the household sector (kitchen equipment of all kinds, cookware of all kinds, cooker, microwave and grill muffles, griddle plates and grill grids, incinerators, food engineering, chemical engineering and pharmaceutical engineering (pipes, containers, reactors), spray drying and other drying systems, exhaust systems of all kinds, industrial plants (paper industry, for example, rollers and pulleys) and water and wastewater treatment systems, automotive systems (exhaust systems), ceramic industry (tiles, sanitary and other ceramic surfaces).

The invention is particularly suitable for containers, especially for cookware. It is preferred that the protective layer according to the invention is disposed on the inside or part of the inside of the container. In addition, a metallic surface of the outer side or part of the outer side of the container may be provided with a second protective layer comprising a base layer comprising a matrix of an alkali and/or alkaline earth silicate, which preferably contains at least one pigment, and a top layer comprising a matrix of an alkali and/or an alkaline earth silicate, preferably comprising a filler, preferably an abrasive filler, for instance a platelet-shaped filler. The base layer of the outer protective layer corresponds in structure and composition to the base layer of the protective layer according to the invention, wherein it is preferred that the base layer of the outer protective layer comprises a catalytically active pigment. The top layer of the outer protective layer also corresponds to the structure of the base layer of the protective layer according to the invention, wherein it is preferred that the top layer of the outer protective layer contains a filler, i.e. white or transparent particles.

The same pigments and fillers described for the protective layer according to the invention may be used in the outer protective layer. Particularly suitable fillers for the top layer of the outer protective layer are, for instance $Al_2O_3$, $SiO_2$ and $TiO_2$ and particularly abrasive fillers, e.g. with a Mohs' hardness of at least 7, such as platelet-shaped $Al_2O_3$, $SiO_2$ and $TiO_2$. Moreover, non-oxidic, hydrolysis-stable abrasive fillers, e.g. nitrides such as BN and carbides such as SiC, may also be used.

The following examples illustrate the invention without limiting it.

EXAMPLES

A) Preparation of coating sols

A1a) Alkali Ion Containing Base Layer 750 ml of methyltriethoxysilane, 210 ml of tetraethoxysilane, 12 g NaOH and 16.8 g of KOH are added to a sealable glass vessel with a stirrer and stirred vigorously. Subsequently, 96 ml of distilled water are added dropwise with vigorous stirring. Then the reaction solution was stirred for a further hour at room temperature.

A1b) Alkaline Earth Ions Containing Base Layer 415 mg of calcium was boiled in anhydrous ethanol under nitrogen until the calcium is dissolved. To the still hot solution of calcium ethoxide, a mixture of 23.3 g of methyl triethoxysilane, 6.5 g of tetraethoxysilane and 3.34 g of water in 3.34 g of isopropanol was added, which was previously refluxed for 30 minutes. The mixture was stirred for 12 h at RT A1c) Alkali Ion-Containing Base Layer with Fe Ion Containing Black Pigment 350 g of black pigment PK 3097 (Ferro) are pre-dispersed in 500 g of butyl glycol while stirring. Subsequently, the dispersion was added to 2.5 kg of the matrix system A1a) and further stirred for 1 hour.

A2) Alkali Ion-Free Top Layer with Nanoscale Filler 87.4 g of methyltriethoxysilane, 25.0 g of tetraethoxysilane were combined with 27 g Levasil® 300/30 and then 820 mg conc. HCl was added dropwise under stirring. After stirring for 5 min a mixture of 29.1 g of methyltriethoxysilane and 8.3 g of tetraethoxysilane was added. Another 5 minutes later, 18.5 g of water was added and the reaction solution was stirred for 15 minutes.

A3a) Fluorine Containing Topcoat I:

25 g of Fluorlink S10 (Solvay) and 1.25 g of TEOS are pre-charged in 465 g of ethanol. 30 mg of sulfuric acid was added dropwise with vigorous stirring and the mixture was subsequently stirred for 30 minutes at room temperature. Then, dilution with 1 kg of ethanol was effected.

A3b) Fluorine Containing Topcoat II with Nanoscale Filler:

35.7 g (0.2 mol) of methyltriethoxysilane, 11.3 g (0.054 mol) of tetraethoxysilane and 20.0 g (0.1 mol $SiO_2$) Levasil® 300/30 were stirred for 5 minutes. Then 0.4 g HCl (37 wt.-%) was added dropwise. After 30 minutes, 0.56 g (0.0071 mol) of (3,3,4,4,5,5,6,6,7,7,8,8,8-tridecafluorooctyl)triethoxysilane was added and stirred for another 30 minutes. Subsequently, 140 g of isopropanol was added, and 1.4 g of Amberlyst A21. After 30 minutes, the ion exchanger was filtered off.

B) Application and curing of coatings

B1) Base Coat:

The base layer was applied by a wet spraying method with a wet film thickness of about 15 µm and then depending on the metallic substrate used baked out at 450-550° C.

B2) Top Coat:

The top layer was applied by a wet spraying method with a wet film thickness of about 10 µm and then depending on the metallic substrate used baked out at 450-550° C.

B3) Fluorine Containing Topcoat:

The freshly prepared solution is either wiped or sprayed onto the substrate. Curing is conducted at 250-300° C.

Assessment

Dishwasher Resistance

Substrates (10 cm×10 cm sheets of stainless steel) provided with a double layer consisting of a base layer according to A1a, b or c, and a top layer according to A2 (without fluorine containing topcoat), prepared as described above, were washed three times per week in a period of 12 months in a conventional dishwasher (model: Siemens IQ series) using a commercially available detergent (compact tabs 3 in 1, aro) at 65° C.

The specimens were evaluated with respect to appearance and adhesion. Even after 12 months defects of any kind are not observed, neither with the eye nor the microscope. Gloss level measurements show that the gloss level of the samples has not been altered within measurement error. Adhesion is also after 12 months still very good (cross-cut tape test: 0/0)

By way of comparison, specimens were prepared as described above, except that only one layer according to A1a, only one layer according to A1b, a double layer consisting of two layers according to A1a or a double layer consisting of two layers according to A1b were applied. The comparative examples were assessed as described above with respect to dishwasher resistance.

The following error patterns are already apparent in the course of several weeks: loss of gloss level (cloudiness), selective defects visible to the naked eye, and also peeling of parts of the layer. The layers can be partially removed with a tape without applying a cross cut.

Chemical resistance

Substrates (10 cm×2 cm sheets of stainless steel) provided with a double layer consisting of a base layer according to A1a, b or c, and a top layer according to A2 (without fluorine containing topcoat), prepared as described above, were boiled in solutions of the following composition (T=100° C.) for a period of from 24 h (1 day) up to 7 days:

a) 10% citric acid
b) distilled water
c) gravy+addition of vinegar, sugar, ketchup, mustard, jam, wine Also after 7 days, no damage of the coatings is observed. Appearance and adhesion remains unchanged. In case of distilled water, the experiment was also carried out with addition of the pH-indicator phenolphthalein. The water remained clear throughout the period.

The above-described comparative examples were tested in the same manner for chemical resistance. The following error patterns occurred during a period of 24-48 hours of continuous boiling: irreversible discoloration of the layers, loss of gloss level, selective partial or complete detachment of the coating from the substrate. Experiments with water containing phenolphthalein yielded depending on the used concentration of alkali or alkaline earth metal ion a strong violet coloration of the water.

Boil-Proof/Anti-Adhesive Properties

On substrates (30 cm×20 cm sheets of stainless steel) provided with a double layer consisting of a base layer according to A1a, b or c, and a top layer according to A2 (without fluorine containing topcoat), prepared as described above, the following experiments at 220° C.-300° C. were carried out:

Browning fish, meat, egg, pancake, ketchup, honey

Preserving a 3% NaCl solution to dryness

Heating up the dry coated plate and then quenching with cold water

It arises as a result that all cooking procedures can be performed without affecting the layers, neither detachment nor defects can be identified. The anti-adhesive property of the layers is present, the plates can be cleaned with a cloth without any difficulties. Just in case of egg/glair a degree of adhesion occurs, which however can be completely removed by gently scraping with a cooking utensil. The coated surfaces can be treated with metallic cooking aids (spoon, fork, scraper, etc.) without any problems.

The above-described comparative examples were tested in the same way with respect to boil-proof/anti-adhesive properties. The following error patterns result: strong adherence of the food, especially egg. The deposit buildup can only be removed by use of rubbing tools (sponges, abrasive cleaners). In the case of egg contamination, the cleaning procedure leads to selective detachment of the layer. The preserving or quenching tests lead to extensive detachment of the layers.

Further, specimens containing either only one layer according to A2 (with or without a filler) or a double layer consisting of layers according to A2 (with or without a filler), which were prepared as described above, were tested.

In the case of the cooking experiments and the concentration experiment, respectively, a similarly good result as described above is obtained. However, in the quenching tests selective defects/delamination may occur due to the thermal stress of the rapid and massive change in temperature. Moreover, in these cases a more easily damage by mechanical means is possible due to insufficient adhesion to the substrate. Tapping with the back of a metal spoon on the layers leads to selective spalling.

By way of comparison, substrates provided with a double layer consisting of a base layer according to A1a and a top layer according to A2 and an additional fluorine-containing topcoat (according to A3a or A3b) prepared as described above, were tested. The result is an excellent anti-adhesive effect for all foods. Either nothing adheres during cooking, or residues can be removed by running cold water. Concentration and quenching tests do not lead to visual impairment.

What is claimed is:

1. An article comprising a metal surface having a protective layer, wherein the protective layer is a glass-, glass-ceramic- or ceramic-type layer and comprises (i) a base layer having a thickness of from 1 to 20 μm and comprising a matrix of an alkali and/or alkaline earth silicate and containing a pigment comprising at least one oxide of one or more of Y, Ce, Ti, Zr, Fe, Co, Ni, Cu, Zn, Nb, and Ta and (ii) a top layer which is arranged on top of (i) and is free of alkali metals and alkaline earth metals and comprises a matrix of an oxidic silicon compound.

2. The article of claim 1, wherein (ii) contains at least one of a pigment and a filler.

3. The article of claim 2, wherein at least one of the at least one of a pigment and a filler is platelet-shaped.

4. The article of claim 1, wherein a fluorine containing and silicon containing anti-adhesive layer is present on (ii).

5. The article of claim 1, wherein an atomic ratio of Si : (alkali metal and/or alkaline earth metal) in (i) is from 20:1 to 7:1.

6. The article of claim 1, wherein at least one of (i) and (ii) is obtained by a method in which a coating composition prepared by a sol-gel process is wet chemically applied to the metal surface or the base layer respectively, and thereafter is thermally densified.

7. The article of claim 1, wherein the article is a container and the protective layer is disposed on an inside or on a part of an inside of the container.

8. The article of claim 7, wherein the container has, on a metal surface of an outside or on a part of an outside, an outer protective layer comprising (i) a base layer comprising a matrix of an alkali and/or alkaline earth silicate and (ii) a top layer comprising a matrix of an alkali and/or alkaline earth silicate which comprises at least one filler.

9. A method of providing the article of claim 1, wherein the method comprises
  (a) wet-chemically applying a coating composition A comprising an alkali silicate and/or an alkaline earth silicate and containing a pigment comprising at least one oxide of one or more of Y, Ce, Ti, Zr, Fe, Co, Ni, Cu, Zn, Nb, and Ta on a metal surface of the article and thereafter thermally densifying the composition to form the base layer having a thickness of from 1 to 20 μm, and
  (b) wet-chemically applying on the base layer a coating composition B comprising an alkali and alkaline earth metal-free hydrolysate or condensate of one or more hydrolyzable silanes and thereafter thermally densifying the composition to form the top layer,
provided that coating composition A can be thermally densified before application of coating composition B or together with coating composition B.

10. The method of claim 9, wherein coating composition A and coating composition B are prepared by a sol-gel process.

11. The method of claim 9, wherein at least one of optionally dried coating composition A and optionally dried coating composition B is densified at a temperature in a range of from 250° to 700° C.

12. The method of claim 9, wherein at least one of
  (i) coating composition A is obtained by hydrolysis and polycondensation of one or more silanes of general formula (I):

$$R_nSiX_{4-n} \qquad (I)$$

wherein the groups X, identical or different from each other, are hydrolyzable groups or hydroxyl groups, the groups R, identical or different from each other, are hydrogen, alkyl, alkenyl and alkynyl groups having up to 4 carbon atoms and aryl, aralkyl and alkaryl groups having 6 to 10 carbon atoms, and n is 0, 1 or 2, provided that at least one silane with n equal to 1or 2 is used, or oligomers derived therefrom,
  in the presence of at least one alkali or alkaline earth metal compound, optionally added nanoscale $SiO_2$ particles and/or optionally alkoxides or soluble compounds of B, Al, Si, Ge, Sn, Y, Ce, Ti or Zr;
  (ii) coating composition B is obtained by hydrolysis and polycondensation of one or more silanes of general formula (I):

$$R_nSiX_{4-n} \qquad (I)$$

wherein the groups X, identical or different from each other, are hydrolyzable groups or hydroxyl groups, the groups R, identical or different from each other, are hydrogen, alkyl, alkenyl and alkynyl groups having up to 4 carbon atoms and aryl, aralkyl and alkaryl groups having 6 to 10 carbon atoms, and n is 0, 1 or 2, provided that at least one silane with n equal to 1 or 2 is used, or oligomers derived therefrom, optionally in the presence of added nanoscale $SiO_2$ particles and/or alkoxides or soluble compounds of B, Al, Si, Ge, Sn, Y, Ce, Ti or Zr; and (iii) a coating composition for an optionally used anti-adhesive layer is obtained by hydrolysis and polycondensation of one or more silanes of general formula (II):

wherein X and R are as defined in general formula (I), Rf is a non-hydrolzable group having 1 to 30 fluorine atoms bound to aliphatic carbon atoms, and b is 0, 1 or 2, and optionally one or more silanes of general formula (I) as defined above, optionally in the presence of added nanoscale $SiO_2$ particles and/or alkoxides or soluble compounds of the metals B, Al, Si, Ge, Sn, Y, Ce, Ti or Zr, or by hydrolysis and polycondensation of one or more silanes of general formula (I) wherein X and R are as defined above and n is 0 in the presence of an organic fluorine compound.

13. The method of claim 9, wherein an atomic ratio of Si : (alkali metal and/or alkaline earth metal) in coating composition A is from 20:1 to 7:1.

14. The method of claim 9, wherein coating composition B contains at least one of a pigment and a filler.

15. The method of claim 9, wherein the method further comprises applying a fluorine containing coating composition comprising a hydrolysate or condensate of a hydrolyzable silicon compound to the top layer and thermally baking the composition to form an anti-adhesive layer.

16. The method of claim 9, wherein an adhesion promoter is applied between the base layer and the top layer.

* * * * *